United States Patent
Lee et al.

(10) Patent No.: US 8,346,707 B2
(45) Date of Patent: Jan. 1, 2013

(54) RULE REASONER, AND DYNAMIC MATERIALIZATION METHOD FOR WILD PATTERN RULES INCLUDING THE SAME

(75) Inventors: Seung Woo Lee, Daejeon (KR); Han Min Jung, Daejeon (KR); Mi Kyoung Lee, Daejeon (KR); Jae Han Kim, Seoul (KR); Beom Jong You, Daejeon (KR); Pyung Kim, Daejeon (KR)

(73) Assignee: Korean Institute of Science & Technology Information, Daejeon (KR)

( * ) Notice: Subject to any disclaimer, the term of this patent is extended or adjusted under 35 U.S.C. 154(b) by 0 days.

(21) Appl. No.: 13/511,034

(22) PCT Filed: Dec. 1, 2009

(86) PCT No.: PCT/KR2009/007095
§ 371 (c)(1),
(2), (4) Date: May 21, 2012

(87) PCT Pub. No.: WO2011/065613
PCT Pub. Date: Jun. 3, 2011

(65) Prior Publication Data
US 2012/0271787 A1  Oct. 25, 2012

(30) Foreign Application Priority Data

Nov. 27, 2009 (KR) .................. 10-2009-0115926

(51) Int. Cl.
G06F 17/00 (2006.01)
G06N 5/02 (2006.01)
(52) U.S. Cl. .......................... 706/48; 706/47
(58) Field of Classification Search ............ 706/48
See application file for complete search history.

(56) References Cited

U.S. PATENT DOCUMENTS 5,129,037 A * 7/1992 Kirk et al. .............. 706/16
(Continued)

FOREIGN PATENT DOCUMENTS

KR  10-2005-0051864 A  6/2005
(Continued)

OTHER PUBLICATIONS

Scaffolding the RETE network, Perlin, M. Tools for Artificial Intelligence, 1990., Proceedings of the 2nd International IEEE Conference on Digital Object Identifier: 10.1109/TAI.1990.130367 Publication Year: 1990 , pp. 378-385.*

(Continued)

*Primary Examiner* — Michael B Holmes
(74) *Attorney, Agent, or Firm* — LRK Patent Law Firm

(57) ABSTRACT

Rule reasoner includes: a Rete network builder for receiving ontology, including ontology instance represented by triple and ontology schema defining classes and properties of the triple, and reasoning rule, building Rete network corresponding to the ontology and the reasoning rule, selecting clue pattern corresponding to wild pattern rule with reference to the ontology schema when reasoning rule having wild pattern is received, rewriting the wild pattern rule with reference to the clue pattern, and adding test node, alpha memory node, and wild rule node so that the rewritten wild pattern rule is incorporated; a Rete network implementer for generating reasoned triple by implementing the Rete network built by the Rete network builder or generating reasoning rule where the wild pattern rule is dynamically materialized; and a Rete network expander expanding the Rete network by inputting the new reasoning rule, generated by the Rete network implementer, to the Rete network builder.

8 Claims, 5 Drawing Sheets

U.S. PATENT DOCUMENTS

| | | | | |
|---|---|---|---|---|
| 5,155,803 | A | * | 10/1992 | Barabash et al. ............... 706/48 |
| 8,015,136 | B1 | * | 9/2011 | Baker et al. ..................... 706/45 |
| 2004/0162741 | A1 | | 8/2004 | Flaxer et al. |
| 2008/0208904 | A1 | | 8/2008 | Friedlander et al. |

FOREIGN PATENT DOCUMENTS

| | | |
|---|---|---|
| KR | 10-2008-0071213 A | 8/2008 |
| KR | 10-2008-0096859 A | 11/2008 |
| KR | 10-2010-0068981 A | 6/2010 |

OTHER PUBLICATIONS

A Method for Network Data Collection and Processing in the Pervasive Computing Environment, Tie Bao; Shufen Liu Pervasive Computing and Applications, 2006 1st International Symposium on Digital Object Identifier: 10.1109/SPCA.2006.297492 Publication Year: 2006 , pp. 599-603.*

An Improved Object-Oriented Rete Algorithm and Network Structure Model, Chenghua Tang; Yi Xie Information Engineering and Electronic Commerce (IEEC), 2010 2nd International Symposium on Digital Object Identifier: 10.1109/IEEC.2010.5533264 Publication Year: 2010 , pp. 1-4.*

The Rete Algorithm Improvement and Implementation, Dongdai Zhou; Yifan Fu; Shaochun Zhong; Ruiqing Zhao, Information Management, Innovation Management and Industrial Engineering, 2008. ICIII '08. International Conference on vol. 1 Digital Object Identifier: 10.1109/ICIII.2008.141 Publication Year: 2008 , pp. 426-429.*

Kruthi Bhoopalam, "Fire-A Description Logic Based Rule Engine for Owl Ontologies With SWRL-like Rules", Concordia University, Canada, Sep. 2005.

Georgios Meditskos et al., "DLEJena: A Practical Forward-Chaining OWL 2 RL Reasoner Combining Jena and Pellet", Web Semantics: Science, Services and Agents on the World Wide Web, Nov. 10, 2009.

* cited by examiner

US 8,346,707 B2

RULE REASONER, AND DYNAMIC MATERIALIZATION METHOD FOR WILD PATTERN RULES INCLUDING THE SAME

TECHNICAL FIELD

The present invention relates to a rule reasoner and a dynamic materialization method for wild pattern rules including the same and, more particularly, to a rule reasoner for dynamically materializing wild pattern rules with reference to an ontology schema and a dynamic materialization method for wild pattern rules including the same.

BACKGROUND ART

In general, a reasoning function is an essential function of lots of semantic web tools. A rule-based reasoning method has become one of most widely used reasoning schemes since a Rete algorithm was developed in 1979. The Rete algorithm was originally developed for the efficiency of a generation rule system and is an algorithm also suitable for rule-based ontology reasoning. Here, the rule refers to an 'if-then' rule, which consists of the left side LHS and the right side RHS. The LHS consists of one or more conditions, and the RHS is executed when the conditions are met.

In ontology, one fact consists of the subject, a predicate, and an object, and each condition is commonly represented by a triple pattern.

Here, the triple pattern means that one or more of the subject, a predicate, and an object of the triple may be variables. The RHS is a conclusion and is also composed of one or more triple patterns. All variables of the RHS must appear in the LHS once or more. If the LHS are matched with the facts of ontology and variables thereof are assigned specific values, the RHS generates a new fact by applying the same variable-value allocation.

In rule-based ontology reasoning, the Rete algorithm is widely used owing to the efficiency of pattern matching. The efficiency lies in that the repetitive matching between patterns shared by several rules can be avoided. The algorithm may also be used in rule-based ontology reasoning by modifying a Task Memory Element (WME) so that it can handle a triple.

Ontology is chiefly written in RDF, RDF/S, and OWL languages. The languages consist of several defined vocabularies. Several entailment rules may be derived from the meanings of the vocabularies. The vocabularies are defined to describe ontology itself. The entailment rules are comprehensive and always valid for specific ontology, and thus commonly having a wild pattern.

An entailment rule having a wild pattern, that is, a wild pattern rule may further deteriorate inefficiency in case of reasoning on large-sale ontology. The large-scale ontology systems are utilized as depositories based on database engines, such as an MS SQL server, ORACLE, and MySQL. Here, triples are chiefly stored according to classes and properties for efficiency. The Rete algorithm may be used for reasoning, but it may be impossible to maintain alpha memory and beta memory of Rete in main memory. One solution is to make alpha memory and beta memory refer to relevant tables through a database view scheme. In this case, alpha memory corresponding to a specific triple pattern must refer to all triple tables, which may cause inefficiency that an unnecessary table is accessed when join is performed at a linked join node.

DISCLOSURE

Technical Problem

Accordingly, the present invention has been made in view of the above problems occurring in the prior art, and an object of the present invention is to solve a problem that inefficiency is caused in rule-based reasoning because the wild pattern of entailment rules may be matched with all triples of target ontology and to provide a rule reasoner for dynamically materializing an input wild pattern rules with reference to an ontology schema and a dynamic materialization method for wild pattern rules including the same.

Technical Solution

To achieve the above object, the present invention provides a rule reasoner, including a Rete network builder for building a Rete network with reference to an ontology schema depending on whether a wild pattern is included in an input reasoning rule, a Rete network implementer for generating a reasoned triple by inputting and implementing an ontology in the built Rete network and for generating a new rule having a dynamically materialized wild pattern, and a Rete network extender for extending the Rete network by adding the generated new rule to the Rete network.

The Rete network builder may include an input unit for receiving the reasoning rule, a determination unit for determining whether the input reasoning rule has a wild pattern, a selection unit for selecting a clue pattern corresponding to the input wild pattern rule if the input reasoning rule is a wild pattern rule having the wild pattern, and a builder for rewriting the input wild pattern rule into a rule with reference to the clue pattern and adding a test node, an alpha memory node, and a wild rule node to the Rete network according to the rewritten rule.

Furthermore, in order to achieve the object, the present invention provides a dynamic materialization method for wild patterns including a rule reasoner, including the steps of (a) a Rete network builder building a Rete network with reference to an ontology schema depending on whether a wild pattern is included in an input reasoning rule, (b) a Rete network implementer generating a reasoned triple by inputting and implementing an ontology in the built Rete network and for generating a new rule having a dynamically materialized wild pattern, and (c) a Rete network extender extending the Rete network by adding the generated new rule to the Rete network.

Advantageous Effects

Accordingly, in accordance with the rule reasoner and the dynamic materialization method for wild pattern rules including the same of the present invention, as compared with the case where inefficiency is caused in rule-based reasoning because the wild pattern of lots of entailment rules including RDF or OWL semantics may be matched with all triples of target ontology, the present invention has an effect in that the inefficiency can be solved by using a materialization scheme, including an initial building step of a Rete network within a Rete framework, a Rete network implementation step of dynamically materializing wild pattern rules by inputting an ontology, and a Rete network extending step.

Furthermore, in accordance with the rule reasoner and the dynamic materialization method for wild pattern rules including the same of the present invention, there are effects in that rule-based reasoning performance and its efficiency are

DESCRIPTION OF REFERENCE NUMERALS OF PRINCIPAL ELEMENTS IN THE DRAWINGS

100: rule reasoner
110: Rete network builder
120: Rete network implementer
130: Rete network extender

MODE FOR INVENTION

The terms or words used in the specification and the claims are should not be construed as being restrictive and typical or dictionary meanings, but should be construed as meanings and concepts which conform with the technical spirit of the present invention based on the principle that an inventor may properly define the concepts of the terms in order to describe his invention using the best method.

Hereinafter, preferred embodiments of the present invention are described with reference to the accompanying drawings.

Figure 1:
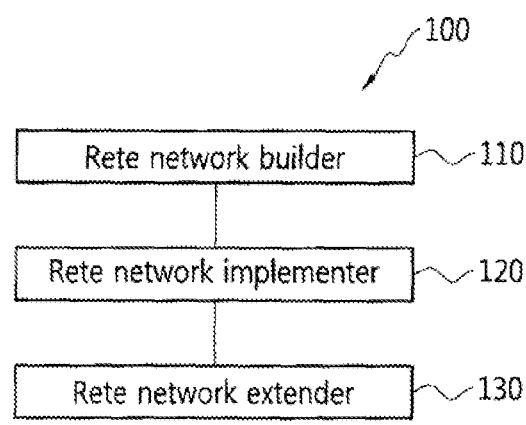
FIG. 1 is a block diagram showing a rule reasoner according to an embodiment of the present invention.

FIG. 1 is a block diagram showing a rule reasoner according to an embodiment of the present invention. As shown in FIG. 1, the rule reasoner 100 according to the embodiment of the present invention includes a Rete network builder 110, a Rote network implementer 120, and a Rete network extender 130.

The Rete network builder 110 builds a proper Rete network with reference to an ontology schema depending on whether a wild pattern is included in an input reasoning rule or not.

The Rete network implementer 120 generates a new rule having a dynamically materialized wild pattern by inputting and implementing an ontology in the built Rete network. That is, the Rete network implementer 120 implements the Rete network built by the Rete network builder 110.

The Rete network extender 130 extends the Rete network by adding the new rule, generated by the Rete network implementer 120, to the Rete network.

Figure 2:
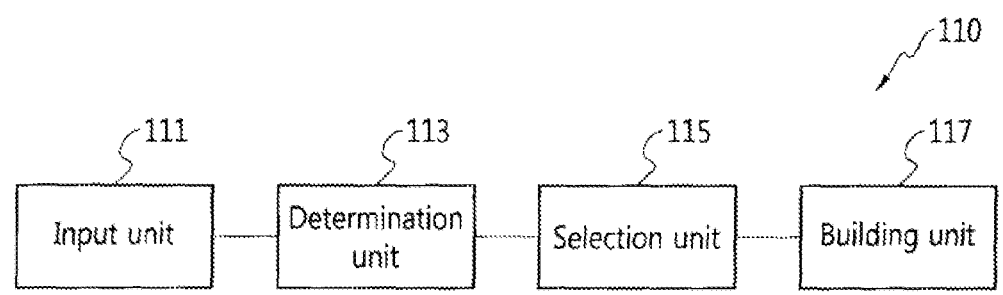
FIG. 2 is a block diagram more particularly showing a Rete network builder of FIG. 1.
Figure 3:
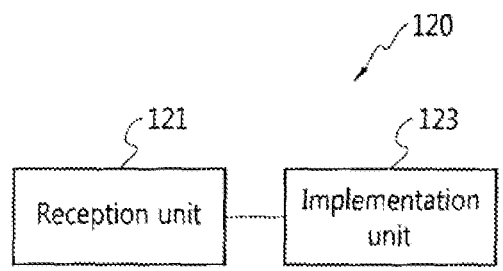
FIG. 3 is a block diagram more particularly showing a Rete network implementer of FIG. 1.

FIGS. 2 and 3 are block diagrams more particularly showing the Rete network builder and the Rete network implementer of FIG. 1. The Rete network builder and the Rete network implementer are described below with reference to FIGS. 1 to 3.

The Rete network builder 110 includes an input unit 111, a determination unit 113, a selection unit 115, and a building unit 117.

The input unit 111 receives a reasoning rule to be reasoned. Although not shown, the reasoning rule may be stored in memory in the form of a file.

The determination unit 113 determines whether the reasoning rule inputted by the input unit 111 has a wild pattern. Here, if the reasoning rule has a wild pattern, the reasoning rule is called a wild pattern rule.

If, as a result of the determination by the determination unit 113, the input reasoning rule has the wild pattern rule, the selection unit 115 selects a clue pattern corresponding to the input wild pattern rules.

The selection unit 115 may select the clue pattern by loading an ontology schema separately stored in the memory, when selecting the clue pattern. This will be described in detail later.

The building unit 117 rewrites the wild pattern rule, inputted by the input unit 111, into a rule with reference to the clue pattern selected by the selection unit 115. Furthermore, the building unit 117 adds a test node, an alpha memory node, and a wild rule node to the Rete network according to the rewritten rule.

Furthermore, the Rete network implementer 120 generates a reasoning rule dynamically materialized along with the generation of a reasoned triple and includes a reception unit 121 and an implementation unit 123.

The reception unit 121 receives a separately stored ontology. Here, the ontology may be an ontology schema and an ontology instance.

The implementation unit 123 generates a reasoned triple generated as a test node, an alpha memory node, a join node, a beta memory node, and a rule node are sequentially implemented according to the ontology received from the reception unit 121 or generates a new rule as the test node, the alpha memory node, and the wild rule node are sequentially implemented.

As described above, after the Rete network corresponding to the input reasoning rule is built and implemented through the Rete network builder 110 and the Rete network implementer 120, the Rete network extender 130 extends the Rete network by adding the generated new rule to the Rete network.

Prior to a detailed description of the dynamic materialization method for wild pattern rules according to an embodiment of the present invention, a wild pattern and a Rete algorithm are described below.

The Rete algorithm is an algorithm suitable for rule-based ontology reasoning. The rule refers to entailment rules described in the RDFS and OWL documents of World Wide Web Consortium (W3C). Table 1 shows an example of entailment rules having a wild pattern which are described in RDF and OWL semantics.

TABLE 1

| Rule name | Entailment rules |
| --- | --- |
| rdfs2 | (?x ?a ?y) (?a rdfs:domain ?z) → (?x rdf:type ?z) |
| rdfs3 | (?x ?a ?y) (?a rdfs:range ?z) → (?y rdf:type ?z) |
| rdfs7 | (?x ?a ?y) (?a rdfs:subPropertyOf ?b) → |

TABLE 1-continued

| Rule name | Entailment rules |
|---|---|
| rdfs9 | (?x ?b ?y)<br>(?x rdfs:subClassOf ?y) (?z rdfs:type ?x) →<br>(?z rdf:type ?y) |
| transprop | (?a rdf:type owl:TransitiveProperty)<br>(?x ?a ?y)(?y ?a ?z) → (?x ?a ?z) |
| inverseof | (?a owl:inverseOf ?b) (?x ?a ?y) → (?y ?b ?x) |

In an ontology, one fact consists of the subject, a predicate, and an object, and thus each condition is commonly represented by a triple pattern. Here, the triple pattern means that one or more of the subject, a predicate, and an object of a triple may be variables.

The wild pattern is an underlined pattern, from among the patterns of Table 1, and it means that a predicate is a variable or a predicate is 'rdf:type' and an object is a variable in the triple pattern.

More particularly, if the predicate is a variable, the wild pattern is called a wild property pattern. If the predicate is 'rdf:type' and an object is a variable, the wild pattern is called a wild class pattern. The wild property pattern corresponds to a pattern, such as (?x ?a ?y), and the wild class pattern corresponds to a pattern, such as (?z rdf:type ?x).

From rules having a wild pattern, there is rule not requiring a join operation. However, examples described in Table 1 are rules requiring one or more join operations.

A wild pattern may be matched with all triples or all class instance triples of a target ontology, and thus a join operation including the wild pattern consumes a lot of time. Accordingly, the wild pattern needs to be converted into materialized rules through a materialization process with reference to an ontology schema.

In fact, a predicate variable may be matched with all predicates defined in an ontology, and the object variables (in other words, class variables) of a wild class pattern may be matched with all classes defined in an ontology. The predicate and class are defined as the schema of an ontology, and the schema may be assumed to be inputted prior to a reasoning rule or an ontology instance (that is, an individual triple). Accordingly, the predicate variable and the class variable may be materialized before reasoning is performed using the ontology schema.

a wild pattern rule, in particular, wild pattern rules requiring a join operation commonly have another triple pattern which restricts the predicate variable or the class variable of a wild pattern. This triple pattern is called a clue pattern. In case of rdf2, (?a rdfs:domain ?z) is the clue pattern, and it restricts the predicate variable '?a' of (?x ?a ?y), that is, a wild pattern.

That is, '?a' must be a property and also the subject of 'rdfs:domain'. For another example, in case of rdfs9, (?x rdfs:subClassOf ?y) corresponds to the clue pattern and restricts the class variable '?x' of (?z rdf:type ?x), that is, a wild pattern. That is, '?x' must be a class and also the subject of 'rdfs:subClassOf'.

A process in which a wild pattern rule is materialized with reference to an ontology schema is described below. Here, the term 'materialization' means that the wild pattern rule is converted into several specific rules. Table 2 is an example of a target defined ontology schema.

TABLE 2

| | |
|---|---|
| <ex:takesCourse,rdfs:<br>domain,ex:Student><br><ex:teacherOf,rdfs:<br>domain,ex:Professor><br><ex:Student,rdfs:<br>subClassOf,ex:Person><br><ex:Professor,rdfs:<br>subClassOf,ex:Person><br><ex:Student,rdf:type,<br>rdfs:Class><br><ex:Professor,rdf:type,<br>rdfs:Class> | <ex:Person,rdf:type,<br>rdfs:Class><br><ex:takesCourse,rdf:type,<br>rdf:Property><br><ex:teacherOf,rdf:type,<br>rdf:Property><br><rdfs:domain,rdf:type,<br>rdf:Property><br><rdf:type,rdf:type,<br>rdf:Property><br><rdfs:subClassOf,rdf:type,<br>rdf:Property> |

When an ontology schema, such as Table 2, is the subject, rule rdfs2 may be materialized into the following two specific rules by using a restriction to the variables of a clue pattern.

rdfs2-1: (?x ex:takesCourse ?y) (ex:takesCourse rdfs:domain ex:Student)→(?x rdf:type ex:Student)

rdfs2-2: (?x ex:teacherOf ?y) (ex:teacherOf rdfs:domain ex:Professor)→(?x rdf:type ex:Professor)

In addition, the second triple pattern in each of the materialized rules is a pattern which no longer has a variable and which is always met in a given ontology. Accordingly, the second triple patterns may be removed from the materialized rule without generalization loss, and the following result is obtained.

rdfs2-1 (?x ex:takesCourse ?y)→(?x rdf:type ex:Student)

rdfs2-2: (?x ex:teacherOf ?y)→(?x rdf:type ex:Professor)

The two rules obtained as described above no longer require a join operation. In contrast, the original wild pattern rules required one join operation. As a result, the efficiency of rule-based reasoning has been improved through the materialization process of the wild pattern.

A rule rdfs9 may also be materialized likewise. A materialized rule obtained as described above is the following two rules.

rdfs9-1: (?z rdf:type ex:Student)→(?z rdf:type ex:Person)

rdfs9-2: (?z rdf:type ex:Professor)→(?z rdf:type ex:Person)

The original wild pattern rule required one join operation, but rules subject to the above materialization process no longer require a join operation.

Figure 4:
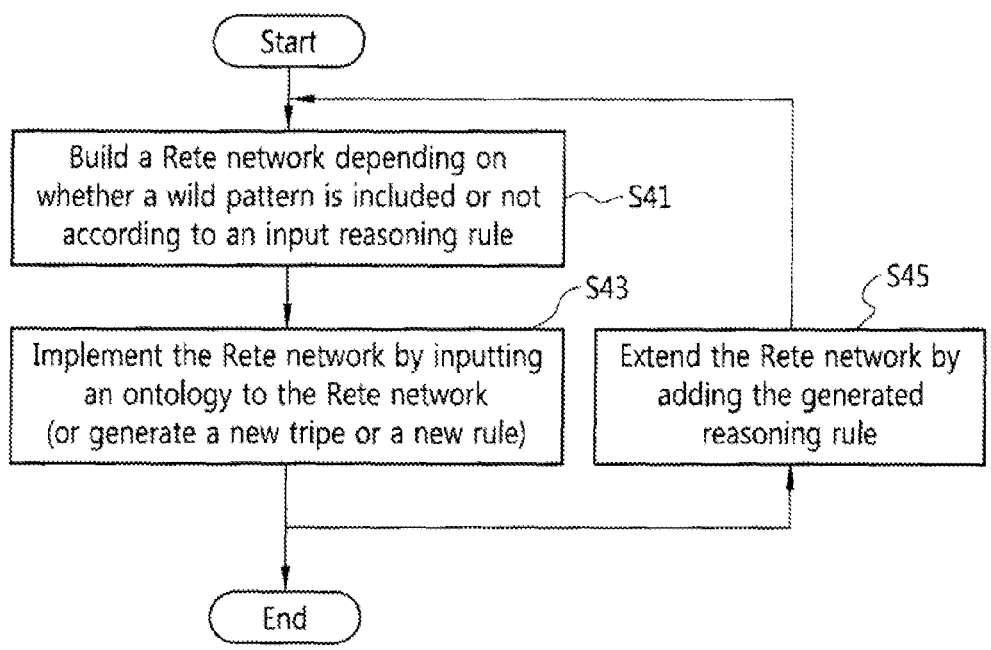
FIG. 4 is a schematic flowchart illustrating a dynamic materialization method for wild pattern rules according to an embodiment of the present invention.

FIG. 4 is a schematic flowchart illustrating a dynamic materialization method for wild pattern rules according to an embodiment of the present invention. Referring to FIG. 4, in a process S41, the Rete network builder 110 builds a proper Rete network with reference to an ontology schema depending on whether a wild pattern is included or not according to an input reasoning rule.

Next, in a process S43, the Rete network implementer 120 generates a reasoned triple by implementing the Rete network by inputting an ontology to the Rete network or generates a new rule having a dynamically materialized wild pattern. This may be considered as a process of implementing the Rete network.

Finally, in a process S45, the Rete network extender 130 extends the Rete network by dynamically materializing the process S43 and adding the generated reasoning rule to the Rete network.

Figure 5:
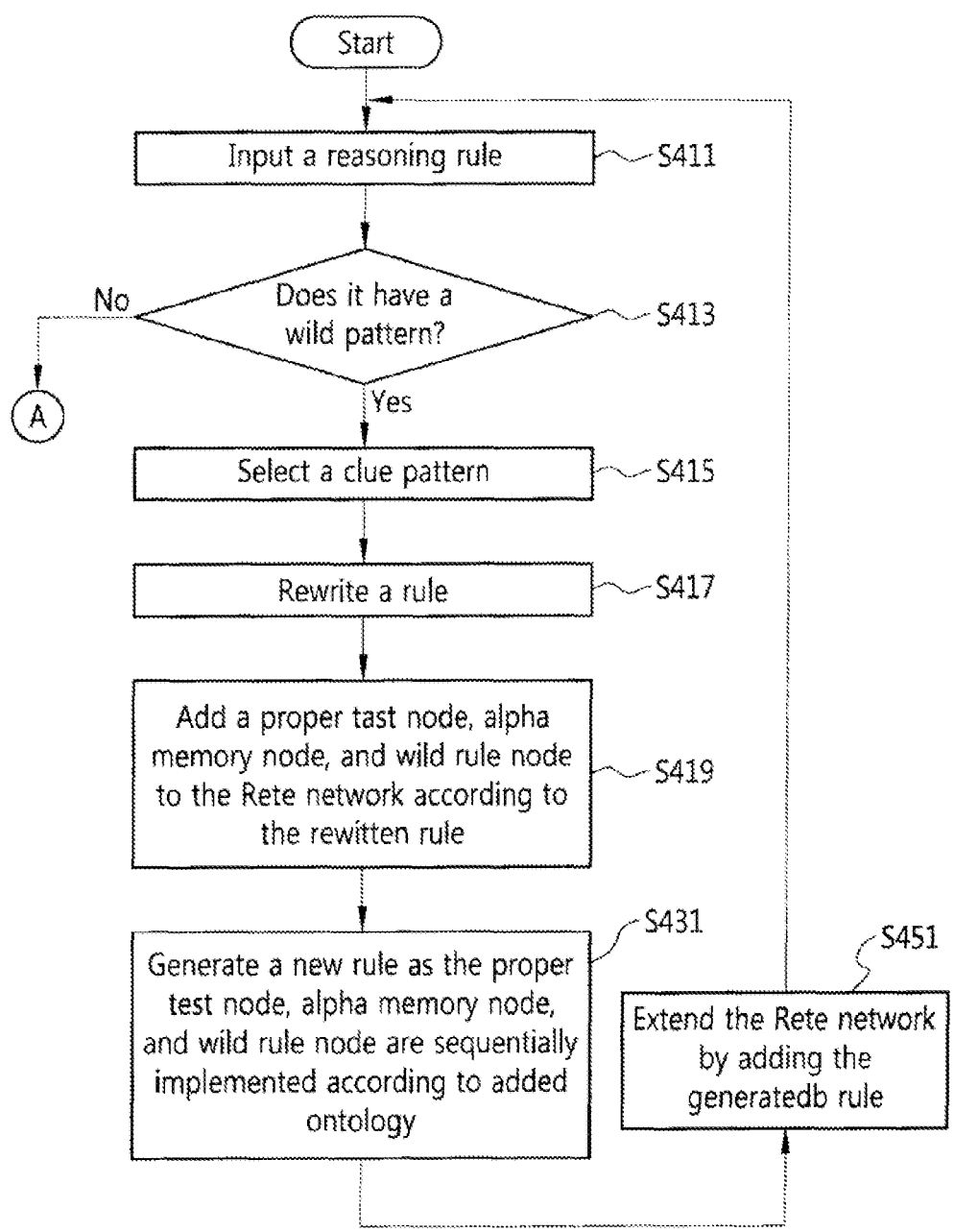
FIG. 5 is a detailed flowchart illustrating the dynamic materialization method for wild pattern rules according to an embodiment of the present invention.
Figure 6:
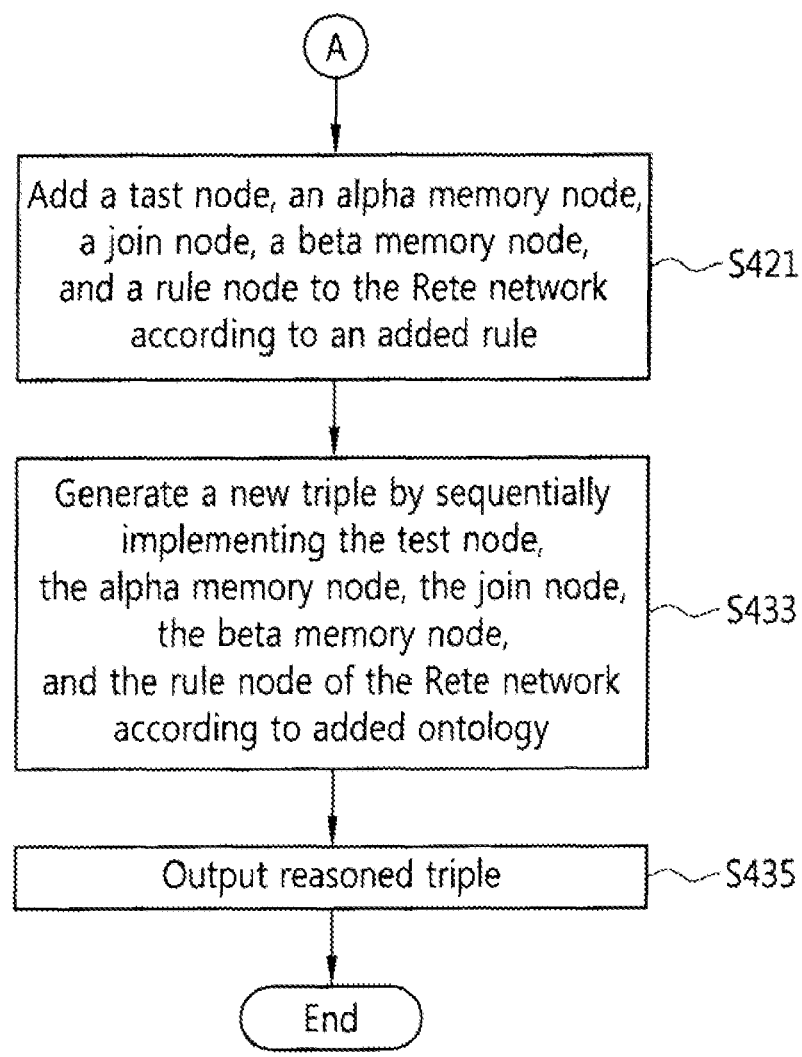
FIG. 6 is a flowchart illustrating an example in which a reasoning rule snot a wild pattern rule according to an embodiment of the present invention.
Figure 7:
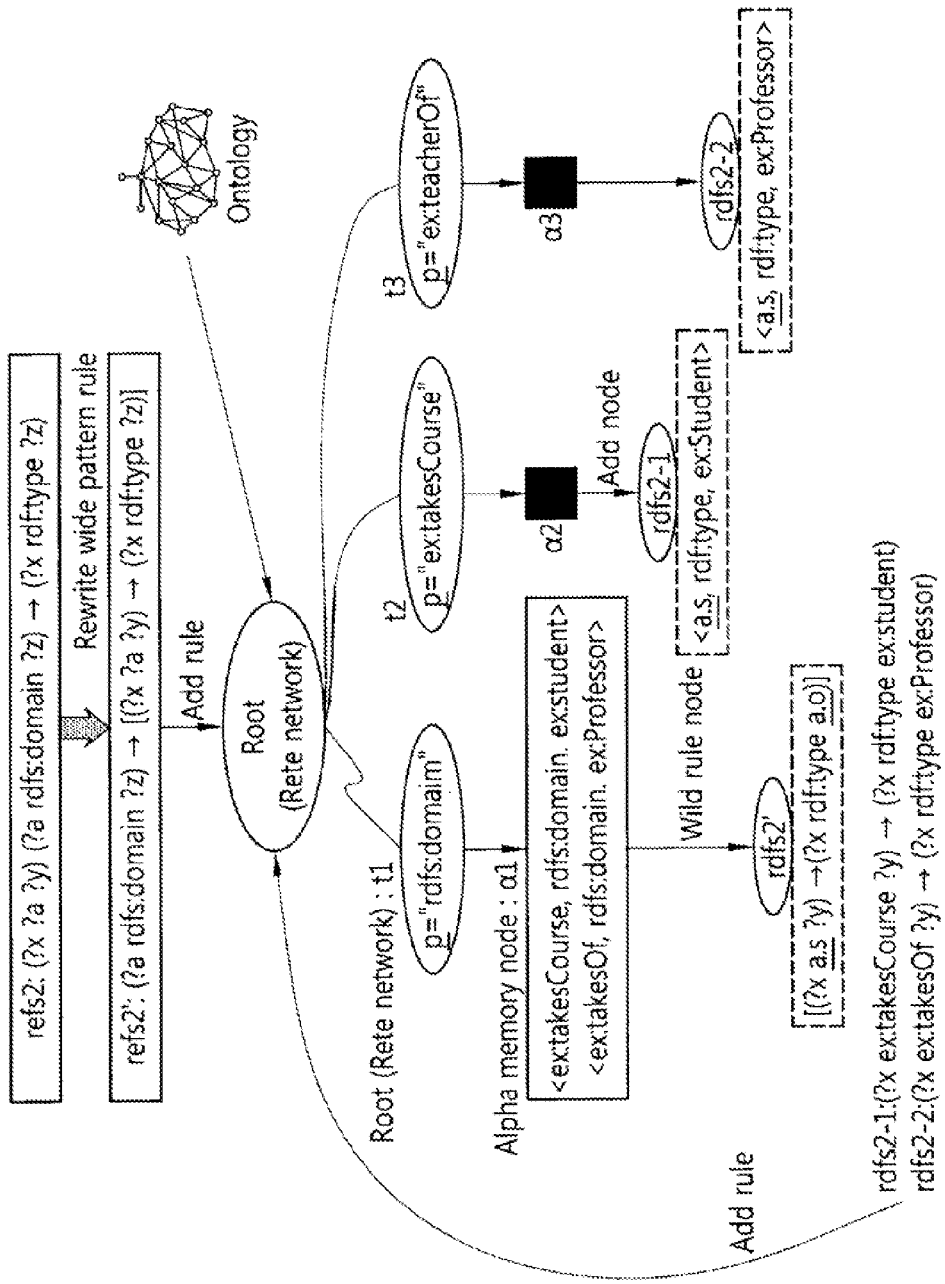
FIG. 7 is an exemplary diagram showing the dynamic materialization method for wild pattern rules according to FIGS. 4 to 6.

FIGS. 5 and 6 are detailed flowcharts illustrating dynamic materialization methods for wild pattern rules according to embodiments of the present invention, and FIG. 7 is an exemplary diagram showing the dynamic materialization method for wild pattern rules according to FIGS. 4 to 6.

Referring to FIGS. 1 to 7, first, in a process S411, the Rete network builder 110 receives a reasoning rule through the input unit 111.

Next, in a process S413, the determination unit 113 determines whether the input reasoning rule is a wild pattern rule having a wild pattern.

Next, in a process S415, if the input reasoning rule is a wild pattern rule, the selection unit 115 selects a clue pattern corresponding to the input wild pattern rule.

For example, referring to FIG. 7, the Rete network builder 110 selects the clue pattern of the input wild pattern rule. At the early stage, the Rete network is generated from given rules. In relation to all non-wild pattern rules, each triple pattern of an LHS, as in a common Rete algorithm, is converted into one path from a root node to an alpha memory node via several middle test nodes. In contrast, in relation to all wild pattern rules, first, a clue pattern that may restrict the variable of a wild pattern is searched for in the conditional clause of a rule.

However, a clue pattern may do not exist in the rule. In this case, a default clue pattern is used. More particularly, in case of a wild property pattern, (?a rdf:type rdf:Property) is used as a default clue pattern. Here, a variable '?a' must correspond to the predicate variable of the wild property pattern. Likewise, in case of a wild class pattern, (?x rdf:type rdfs:Class) is used as a default clue pattern. Here, a variable '?x' must correspond to the class variable of the wild class pattern.

After the clue pattern is selected, in a process S417, the Rete network builder 110 rewrites the wild pattern rule into a new rule having a rule which has only the clue pattern in the LHS of the rule and in which the clue pattern has been removed from the original rule in the RHS.

For example, as shown in FIG. 7, a rule rdfs2 is rewritten into a rule rdfs2' by using the clue pattern (?a rdfs:domain ?z).

Next, in a process S419, the Rete network builder 110 builds a proper test node t1 and a proper alpha memory node α1 like in a common Rete network by adding the rewritten rule to the Rete network. A wild rule node is followed by each of the proper test node t1 and the proper alpha memory node α1. The wild rule node is similar to the rule node of the original Rete algorithm in that it corresponds to the RHS of the rule, but clearly differs from the rule node of the original Rete algorithm in that the rule node generates a triple extended by reasoning, whereas the wild rule node generates a materialized rule.

As shown in FIG. 7, the wild rule node rdfs2' is a rule template for materialization, and it has [(?x α.s y)→(?x rdf:type α.o)]. Here, α.s and α.o refer to the subject and object of alpha memory, respectively.

Next, in a process S431, the Rete network implementer 120 implements the Rete network by inputting an ontology, given in a file form, to the Rete network.

That is, the Rete network implementer 120 activates the test node and the alpha memory node by sequentially implementing the test node and the alpha memory node and then dynamically generates materialized reasoning rules by activating the wild rule node.

More particularly, when the wild rule node is activated, a specific reasoning rule, that is, the materialized reasoning rules are dynamically generated by the rule template of the wild rule node. Referring to FIG. 7, rdfs2-1 and rdfs2-2 are rules materialized through the process S431.

Finally, in a process S451, the Rete network extender 130 extends the Rete network by adding the new rules, generated through the process S431, to the Rete network.

Here, if the materialized rule still has a wild pattern rule, the processes S415 to S431 shown in FIG. 5 are repeated until the materialized rule no longer has the wild pattern.

If, as a result of the determination of the determination unit 113 in the process S413, the generated rule or the input reasoning rule does not have a wild pattern, as shown in FIG. 6, in a process S421, the Rete network builder 110 adds a test node, an alpha memory node, a join node, a beta memory node, and a rule node to the Rete network according to an added rule.

Next, in a process S433, the Rete network implementer 120 generates a new triple by sequentially implementing the test node, the alpha memory node, the join node, the beta memory node, and the rule node of the Rete network according to an' added ontology.

Next, in a process S435, although not shown, the Rete network implementer 120 repeats the implementation of the Rete network by inputting the reasoned triple to the Rete network again until a new triple is no longer reasoned and then outputs the reasoned triple.

More particularly, as shown in FIG. 7, some nodes, such as test nodes t2 and t3, alpha memory nodes α2 and α3, and rule nodes rdfs2-1 and rdfs2-2, are generated.

Finally, in order to check the validity of the dynamic materialization method for wild pattern rules according to the embodiment of the present invention, several statistical numeral values in a Rete network produced using entailment rules of Table 3 and an ontology schema of LUBM were examined.

TABLE 3

|  | When materialization was not applied | When materialization was applied |
| --- | --- | --- |
| # of test nodes | 8 | 71 |
| # of alpha memories | 8 | 69 |
| # of join nodes | 7 | 1 |
| # of join operations tried | 10 billions | 57121 |

First, the number of test nodes, the number of alpha memory nodes, the number of join nodes, and the number of join operations tried when the Rete network was built in the state in which the materialization scheme according to an embodiment of the present invention was not applied were counted. The counted numeral values are shown in the left column of Table 3.

Furthermore, the same statistical numeral values when the materialization scheme was applied when the Rete network was built were counted, and the counted numeral values are shown in the right column of Table 3. Here, the influence of the reasoned triple on the Rete network again was excluded, for convenience of calculation.

As listed in Table 3, it can be seen that, if the materialization scheme according to the embodiment of the present invention is applied, the number of each of the test nodes and the alpha memory nodes was significantly increased, but the number of join nodes was effectively reduced. That is, 88 test nodes (86 alpha memory nodes) were added by the materialization scheme according to the embodiment of the present invention, but 25 of the 88 test nodes was shared. As a result, 71 test nodes and 69 alpha memory nodes are increased. In case of the join operations, however, 7 join nodes were in the original rule, but only one join node (in case of a transprop rule) remained after materialization was applied.

In order to count the number of join operations tried when join nodes are activated, an ontology instance of LUBM(1,0) was used. The ontology instance consisted of about hundred thousand triples. When the materialization scheme was not applied, at least 100 billion join operations (in case of a transprop rule) may be tried because a wild property pattern may be matched with all triples. When the materialization scheme was applied, however, only about 57 thousand join operations may be tried because LUBM(1,0) has 239 ub:sub-OrganizationOf triples. From the above results, it can be seen that rule-based reasoning performance (in terms of the speed) can be significantly improved through the materialization process of a wild pattern rule.

That is, a lot of entailment rules of RDF and OWL semantics have a wild pattern in a conditional part. The wild pattern may cause significant inefficiency in rule-based reasoning because it may be matched with all triples of a target ontology. Furthermore, the inefficiency may become more severe when the size of the target ontology is increased.

However, through the rule reasoner and the dynamic materialization method for wild pattern rules including the same according to the embodiments of the present invention, the inefficiency can be avoided, and the materialization method may be implemented within a Rete framework, that is, an efficient algorithm widely used for rule-based reasoning. In order to measure the effects of the dynamic materialization method, how much had the number of join nodes been reduced and how much had the number of tried join operations been reduced in the Rete network were counted and then compared with those before the materialization scheme was applied. As a result of the comparison, it could be seen that rule-based reasoning performance (in terms of the speed) can be significantly improved through the materialization process of a wild pattern rule.

As described above, although the preferred embodiments of the present invention have been described, the present invention is not limited to the above-described embodiments, and it may have a methodological spirit to the extent that a person having ordinary skill in the art to which the present invention pertains may modify the embodiments in various ways without departing from the gist of the present invention claimed in the claims.

The invention claimed is:

1. A rule reasoner comprising:
a Rete network builder for receiving an ontology, including an ontology instance represented by a triple and an ontology schema defining classes and properties of the triple, and a reasoning rule, building a Rete network corresponding to the received ontology and the received reasoning rule, selecting a clue pattern corresponding to a wild pattern rule with reference to the ontology schema when a reasoning rule having a wild pattern (the wild pattern rule) is received, rewriting the received wild pattern rule with reference to the selected clue pattern, and adding a test node, an alpha memory node, and a wild rule node so that the rewritten wild pattern rule is incorporated;
a Rete network implementer for generating a reasoned triple by implementing the Rete network built by the Rete network builder or generating a reasoning rule into which the wild pattern rule has been dynamically materialized; and
a Rete network expander for expanding the Rete network by inputting the new reasoning rule, generated by the Rete network implementer, to the Rete network builder.

2. The rule reasoner according to claim 1, wherein the Rete network builder comprises:
an input unit for receiving the reasoning rule;
a determination unit for determining whether the received reasoning rule has a wild pattern;
a selection unit for selecting the clue pattern corresponding to the wild pattern rule with reference to the ontology schema, if the received reasoning rule is a wild pattern rule having a wild pattern; and
a building unit for rewriting the received wild pattern rule with reference to the clue pattern and adding the test node, the alpha memory node, and the wild rule node to the Rete network according to the rewritten wild pattern rule.

3. The rule reasoner according to claim 2, wherein the rewritten wild pattern rule has only the clue pattern on a left side LHS and has the clue pattern removed from an original wild pattern rule on a right side RHS.

4. The rule reasoner according to claim 1, wherein the wild rule node generates the reasoning rule into which the wild pattern rule has been dynamically materialized.

5. The rule reasoner according to claim 1, wherein the Rete network builder adds a test node, an alpha memory node, a join node, a beta memory node, a rule node, and a wild rule node, corresponding to the new reasoning rule generated by the Rete network implementer, to the Rete network.

6. A dynamic materialization method for wild patterns including a rule reasoner, comprising the steps of:
(a) by a Rete network builder, receiving an ontology, including an ontology instance represented by a triple and an ontology schema defining classes and properties of the triple, and a reasoning rule, building a Rete network corresponding the received ontology and the received reasoning rule, selecting a clue pattern corresponding to a wild pattern rule with reference to the ontology schema when a reasoning rule having a wild pattern (the wild pattern rule) is received, rewriting the received wild pattern rule with reference to the selected clue pattern, and adding a test node, an alpha memory node, and a wild rule node so that the rewritten wild pattern rule is incorporated;
(b) by a Rete network implementer, generating a reasoned triple by inputting the ontology to the built Rete network and implementing the built Rete network or by generating a new reasoning rule into which the wild pattern rule has been dynamically materialized; and
(c) by a Rete network expander, expanding the Rete network by adding the new reasoning rule to the Rete network.

7. The dynamic materialization method according to claim 6, wherein the step (a) comprises the steps of:
by the Rete network builder, receiving the reasoning rule;
by the Rete network builder, determining whether the received reasoning rule is a wild pattern rule having a wild pattern;
by the Rete network builder, selecting a clue pattern corresponding to the received wild pattern rule with reference to the ontology schema, if the received reasoning rule is the wild pattern rule;
by the Rete network builder, rewriting the received wild pattern rule with reference to the clue pattern; and
by the Rete network builder, adding a test node, an alpha memory node, and a wild rule node, corresponding to the rewritten wild pattern rule, to the Rete network.

8. The dynamic materialization method according to claim 6, wherein in the step (b), the Rete network implementer generates a new reasoning rule by sequentially implementing the test node, the alpha memory node, and the wild rule node according to an added ontology.

* * * * *